May 7, 1935.  D. F. OTHMER  2,000,606
COUNTER CURRENT LIQUID EXTRACTION APPARATUS
Filed May 27, 1930

Fig.1.

Fig.2.

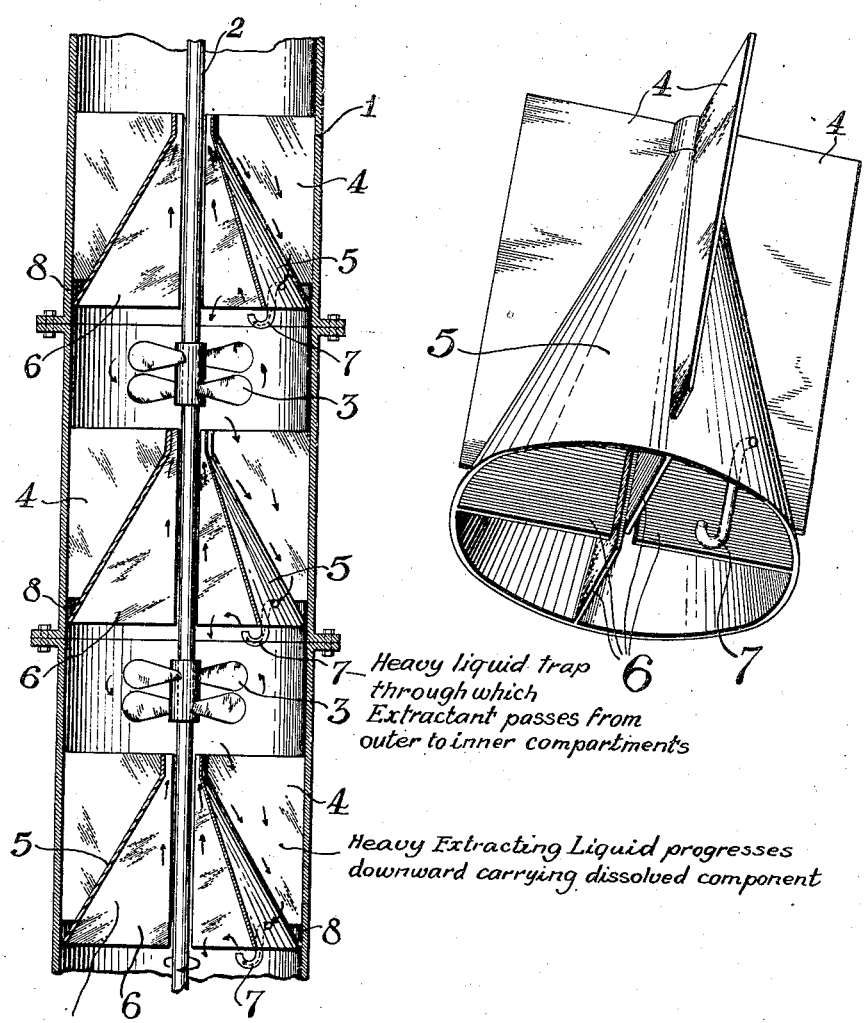

Heavy liquid trap through which Extractant passes from outer to inner compartments Heavy Extracting Liquid progresses downward carrying dissolved component Light Extracted Liquid freed from dissolved component progresses upward Donald F. Othmer,
Inventor, By Newton M. Perkins
Daniel J. Mayne
Attorneys.

Patented May 7, 1935

2,000,606

UNITED STATES PATENT OFFICE 2,000,606

COUNTER CURRENT LIQUID EXTRACTION APPARATUS

Donald F. Othmer, Rochester, N. Y., assignor to Eastman Kodak Company, Rochester, N. Y., a corporation of New York Application May 27, 1930, Serial No. 456,272

3 Claims. (Cl. 23—270)

This invention relates to an apparatus for the separation of miscible liquids, and particularly to an apparatus for carrying out separation methods employing a third component for the extraction of one of the miscible constituents.

There are numerous chemical processes involving the use of two or more miscible liquids which require, for their commercial operation, some means for the separation of one or more of the constituents from the mixture. Many of these problems are solved by distillation. For example in the wood distillation industry such a method is sometimes employed in the separation of acetic acid from pyroligneous liquids. In the organic solvent industry similar problems are met with in the separation of constant boiling mixtures. Numerous other industries have similar separation problems to contend with. It is possible, in some instances, to separate by distillation miscible constant boiling mixtures by adding thereto a third component which forms a low boiling mixture with one of the constituents thereof. Extraction processes for the separation of miscible liquids, however, often are more efficient and economical of operation than the distillation processes.

This invention has as an object to provide an apparatus for the separation of miscible liquids. Another object is to provide an apparatus operating upon the counter-current principle in which excessive turbulence of the liquids is effectively prevented. Other objects will appear hereinafter.

I have found that liquid mixtures having two or more miscible constituents can be readily separated in a continuous manner by adding thereto a third constituent, substantially immiscible with the mixture and having a different specific gravity than the mixture, but a solvent for one or more of the constituents thereof, thoroughly agitating the resulting mixture and subsequently causing it to flow into a space where the turbidity of the mixture is quieted and wherein the immiscible portions thereof separate by gravity.

Reference will now be made to the appended drawing in which like reference characters refer to like parts throughout and in which Figure 1 is a partial cross sectional elevation of one form of my apparatus one side of the cone being extended to show one position of the heavy liquid trap; Figure 2 is a detail view of one of the sections of this apparatus.

The apparatus is preferably built in a columnar form and in sections as shown in Figure 1 in which 1 designates the wall of the section. Through the center of each of these sections extends a vertical rotatable shaft 2 to which is attached in the upper part of each section a paddle wheel 3. The liquid which enters the top of the column of any desirable number of sections, the number being governed by the type of mixture being extracted, passes into the area about the paddle wheel 3, is thoroughly agitated by the paddle wheel and then passes into that part of the section below this area which is provided with outer fins 4 extending from the wall of the section 1 to the outer surface of the hollow conical member 5, thereby forming a plurality of settling compartments. Underneath this cone there is a series of inner fins 6 extending from the under surface of the cone almost to the rotatable shaft 2, thus forming another set of compartments on the under surface of the cone, each compartment, however, communicating freely with the others on that side of the cone through the space surrounding the shaft 2. The prime mover for rotating the central shaft 2 and the latter's bearings are of any suitable type and not shown. In each section the heavier liquid which is thrown to the outer walls of the section passes down the outer surface of the cone and into the section below through the heavy liquid trap 7.

The outer fins 4, therefore, do not extend to the intersection of the lower portion of the cone and the wall 1, but there is a plurality of openings 8 connecting the outer compartments through which the heavy liquid may pass to the heavy liquid trap 7. Obviously a plurality of traps 7 (one for each compartment) would dispense with the necessity of the openings 8. The method of attaching the inner and outer fins is shown in the diagrammatic drawing Figure 2. A plurality of fins are, of course, advisable in order that the turbulent liquid entering these compartments be quieted after the agitation to which it has been submitted by the paddles 3. It must be noted that the paddles 3 are to have no screw action—i. e. they are not to interfere with gravitational settling by directing liquid either up or down.

Further reference will be made in the specification and claims to sections and compartments, but it will be understood that the term "section" refers to a component part or unit of the apparatus, each unit containing an agitating chamber and a settling chamber, and that the term "compartment" refers to any one of the sub-divisions of the settling chamber formed by the radiating fins.

The extraction of a mixture of two or more miscible liquids, by another liquid (which may consist of one or more liquids) which is heavier than the mixture and which is a solvent for one or more of the constituents of the mixture is conducted in the following manner. The mixture being extracted is fed into a lower section of the column while the heavy extraction liquid is fed into an upper section of the column. The column, of course, should preferably be charged prior to beginning the extraction process. When the extraction liquid and the mixture to be extracted come into the paddle area of a section, the two are violently agitated by the paddle, thus allowing intimate contact between the extraction liquid and the mixture being extracted. The heavier extraction liquid and its occluded solute pass downwardly into the quieting area of the section, its turbulence is arrested and this heavy liquid then rapidly separates from the lighter miscible liquid, passes down the side of the cone portion 5 and thru the heavy liquid trap 7 into the section below in which the extraction is repeated. The lighter liquid, after being agitated in the paddle section of the column is quieted to remove heavier liquid as it passes upwardly into the fin portion below the cones and then through the opening between the apex of the cone and the rotating shaft 2 into the section above where it is again contacted with the heavier extraction liquid. This cycle is repeated in each section, the extracted liquid being removed at the top and the extracting liquid with the material dissolved therein at the bottom of the column.

If the conical section is adhered to it is evident that the ratio of settling volume for the lighter liquid inside the cone to that of the heavier liquid outside the cone is as one to two since the volume of cone is one third the volume of the circumscribed cylinder. In some pairs of agitated liquids forming finely divided drops or emulsions the rate of settling of the lighter drops from the heavier liquid is much different than the rate of settling of the heavier drops from the lighter liquid. It is possible to accommodate this phenomena by varying the relative volume of the two settling areas. This may be accomplished by extending the fins 4 above the upper outlet of the cone if the heavier settling space is to be relatively increased, or extending the lower fins 6 below the lower edge of the cone if the lighter settling liquid volume is to be increased. In the usual case this latter arrangement would probably be used.

Of course, if the extraction liquid be lighter than the miscible solvent mixture to be extracted, these liquids would be fed into the column in the reverse order, that is, the lighter extraction liquid would be fed into the bottom of the column while the heavier liquid mixture to be extracted into the top of the column.

As an example of a liquid extraction process in which my process and apparatus may be used, may be cited the extraction of aqueous acetic acid with ethyl acetate. In this case as the ethyl acetate is the lighter liquid it is fed into the bottom of the column while the aqueous acetic acid is fed into the top of the column. The maximum amount of acetic acid that can be removed from a certain aqueous acetic acid mixture in any given number of sections will, of course, be determined by the distribution ratio of the acetic acid between the ethyl acetate and water mixtures and relative amounts of the ethyl acetate and aqueous acetic acid present.

While hereinabove I have stressed the use of my apparatus particularly for the extraction of one or more liquids from a mixture of miscible liquids it may likewise be used for many analogous processes such for instance as the extraction or breaking up of emulsions. This may be effected by treating the emulsion in my extractor with a solvent for the one or more of the emulsified materials but insoluble in the others. Other uses, to which my apparatus is specially adapted, are the various washing and neutralizing processes of the chemical industry. Examples of these are the treatment of oils and gasolene with sulfuric acid to remove impurities, etc. and its subsequent neutralization with caustic soda and finally washing with water. Numerous other purposes to which my apparatus may be applied will suggest themselves to those skilled in this art.

From a consideration of the above description it will be realized that any liquid extraction or washing apparatus in which the extraction or washing is conducted in a continuous manner and by a counter current conducting process, and in which the extracting liquid and the liquid being extracted are first violently agitated in one section of the apparatus and subsequently allowed to separate into their constitutents will come within the scope of this invention. The relative dimensions of columns similar to that described above will of course, be determined by the type of liquid being extracted which, in turn, would determine the number of liquid discharge taps necessary for each section, as well as the size of the sections. The inner and outer baffles per section as well as the design of the paddles will also largely depend on the size of the apparatus and the particular nature of the liquid being extracted. The speed of rotation of the shaft and the relative rate of feeding these two liquids into the column should, of course, be determined in each particular case and the efficiency of the apparatus will be governed in some measure by the correct regulation of these variables.

What I claim as my invention and desire to be secured by Letters Patent of the United States is:

1. A counter current liquid extraction apparatus comprising a vertically disposed container through the center of which extends a rotatable shaft to which is fixed an agitating device, and in proximity thereto fins radiating from the outer and inner surfaces of a cone, located in the container, whereby compartments are formed, passages inter-connecting the outer compartments formed by said outwardly radiating fins, and a liquid trap permitting liquids to flow from the outer to the inner surface of the cone, and another passage from the inner to the outer surface of the cone.

2. In a counter current liquid extraction apparatus, a vertically disposed container having a plurality of sections, a rotatable shaft extending through the center of each section, an agitating device in one portion of each section fixed to the shaft, inner and outer compartments in another portion of each section in which the liquid separates by gravity, said compartments being formed by a cone-shaped member disposed within each section concentrically with the shaft, said cone-shaped member having vertically disposed baffles radiating therefrom and passages leading from the outer compartments to the section below and passages leading from the inner compartments to the section above.

3. In a counter current liquid extraction apparatus a vertically disposed container having a plurality of sections, a rotatable shaft extending through the center of each section, an agitating device in one portion of each section fixed to the shaft, radial fins in another portion of each section extending from the inner and outer surfaces of a cone located therein to form compartments, passages inter-connecting the outer compartments, a liquid trap connecting the inner and outer compartments, thereby permitting flow of liquid from the outer compartments to the inner compartments and an untrapped passage leading from the inner compartments to the section above.

DONALD F. OTHMER.